United States Patent [19]
Okamoto et al.

[11] Patent Number: 5,805,469
[45] Date of Patent: Sep. 8, 1998

[54] DIGITAL AUDIO SIGNAL PROCESSING APPARATUS AND METHOD FOR ERROR CONCEALMENT

[75] Inventors: Ichiro Okamoto, Tokyo; Kazuhiko Ozawa; Isao Miyai, both of Kanagawa; Shinji Nakamura, Tokyo, all of Japan

[73] Assignee: Sony Corporation, Tokyo, Japan

[21] Appl. No.: 754,676

[22] Filed: Nov. 21, 1996

[30] Foreign Application Priority Data

Nov. 30, 1995 [JP] Japan .................................. 7-335938

[51] Int. Cl.$^6$ ....................................................... G06G 7/30
[52] U.S. Cl. ............................................. 364/577; 371/31
[58] Field of Search ..................................... 364/577, 723, 364/737, 736.5; 360/53; 348/616, 466; 386/116, 47, 50; 371/31, 40.16, 37.01; 341/94

[56] References Cited

U.S. PATENT DOCUMENTS

| | | | |
|---|---|---|---|
| 4,660,200 | 4/1987 | Okamoto et al. ......................... 371/37 |
| 4,882,732 | 11/1989 | Kaminaga ................................ 371/2.2 |
| 5,027,209 | 6/1991 | Nishimura et al. ..................... 358/160 |
| 5,142,537 | 8/1992 | Kutner et al. ............................. 371/31 |
| 5,353,059 | 10/1994 | Lawlor et al. .......................... 348/398 |
| 5,483,388 | 1/1996 | Shimizu .................................... 360/53 |

*Primary Examiner*—James P. Trammell
*Attorney, Agent, or Firm*—Frommer Lawrence & Haug LLP; William S. Frommer; Dennis M. Smid

[57] ABSTRACT

A method and apparatus for determining an interpolated value for an audio data error sample included within a plurality of audio data samples. The audio data error sample may be replaced with the determined interpolated value so as to conceal the error sample. Such method and apparatus involves detecting an error pattern which corresponds to the presence or absence of errors of a number of data samples before and after the error sample to be concealed, obtaining coefficients based upon the detected error pattern, and processing the audio data samples and coefficients in a manner corresponding to an interpolating equation of an nth degree (where n=1, 2, 3 . . . ) so as to obtain the interpolated value. Such interpolating equation may correspond to a Lagrange polynomial equation.

22 Claims, 9 Drawing Sheets

Fig. 5

| | j= | 10, 11 | 12, 13 | 14, 15 | | 78, 79 | 80, 81 |
|---|---|---|---|---|---|---|---|
| | i=2 | D0 | D45 | D90 | . . . | D1530 | D1575 |
| | 3 | D15 | D60 | D105 | . . . | D1545 | D1590 |
| | 4 | D30 | D75 | D120 | . . . | D1560 | D1605 |
| TRACK0 | 5 | D10 | D55 | D100 | . . . | D1540 | D1585 |
| OR | 6 | D25 | D70 | D115 | . . . | D1555 | D1600 |
| TRACK5 | 7 | D40 | D85 | D130 | . . . | D1570 | D1615 |
| | 8 | D5 | D50 | D95 | . . . | D1535 | D1580 |
| | 9 | D20 | D65 | D110 | . . . | D1550 | D1595 |
| | 10 | D35 | D80 | D125 | . . . | D1565 | D1610 |
| | i=2 | D3 | D48 | D93 | . . . | D1533 | D1578 |
| | 3 | D18 | D63 | D108 | . . . | D1548 | D1593 |
| | 4 | D33 | D78 | D123 | . . . | D1563 | D1608 |
| TRACK1 | 5 | D13 | D58 | D103 | . . . | D1543 | D1588 |
| OR | 6 | D28 | D73 | D118 | . . . | D1558 | D1603 |
| TRACK6 | 7 | D43 | D88 | D133 | . . . | D1573 | D1618 |
| | 8 | D8 | D53 | D98 | . . . | D1538 | D1583 |
| | 9 | D23 | D68 | D113 | . . . | D1553 | D1598 |
| | 10 | D38 | D83 | D128 | . . . | D1568 | D1613 |
| | i=2 | D6 | D51 | D96 | . . . | D1536 | D1581 |
| | 3 | D21 | D66 | D111 | . . . | D1551 | D1596 |
| | 4 | D36 | D81 | D126 | . . . | D1566 | D1611 |
| TRACK2 | 5 | D1 | D46 | D91 | . . . | D1531 | D1576 |
| OR | 6 | D16 | D61 | D106 | . . . | D1546 | D1591 |
| TRACK7 | 7 | D31 | D76 | D121 | . . . | D1561 | D1606 |
| | 8 | D11 | D56 | D101 | . . . | D1541 | D1586 |
| | 9 | D26 | D71 | D116 | . . . | D1556 | D1601 |
| | 10 | D41 | D86 | D131 | . . . | D1571 | D1616 |
| | i=2 | D9 | D54 | D99 | . . . | D1539 | D1584 |
| | 3 | D24 | D69 | D114 | . . . | D1554 | D1599 |
| | 4 | D39 | D84 | D129 | . . . | D1569 | D1614 |
| TRACK3 | 5 | D4 | D49 | D94 | . . . | D1534 | D1579 |
| OR | 6 | D19 | D64 | D109 | . . . | D1549 | D1594 |
| TRACK8 | 7 | D34 | D79 | D124 | . . . | D1564 | D1609 |
| | 8 | D14 | D59 | D104 | . . . | D1544 | D1589 |
| | 9 | D29 | D74 | D119 | . . . | D1559 | D1604 |
| | 10 | D44 | D89 | D134 | . . . | D1574 | D1619 |
| | i=2 | D12 | D57 | D102 | . . . | D1542 | D1587 |
| | 3 | D27 | D72 | D117 | . . . | D1557 | D1602 |
| | 4 | D42 | D87 | D132 | . . . | D1572 | D1617 |
| TRACK4 | 5 | D7 | D52 | D97 | . . . | D1537 | D1582 |
| OR | 6 | D22 | D67 | D112 | . . . | D1552 | D1597 |
| TRACK9 | 7 | D37 | D82 | D127 | . . . | D1567 | D1612 |
| | 8 | D2 | D47 | D92 | . . . | D1532 | D1577 |
| | 9 | D17 | D62 | D107 | . . . | D1547 | D1592 |
| | 10 | D32 | D77 | D122 | . . . | D1562 | D1607 | i : SYNC BLOCK NO.
j : BYTE POSITION NO.

Fig. 6

| | | j= 10, 11 | 12, 13 | 14, 15 | | 78, 79 | 80, 81 |
|---|---|---|---|---|---|---|---|
| | i=2 | D0 | D54 | D108 | ... | D1836 | D1890 |
| | 3 | D18 | D72 | D126 | ... | D1854 | D1908 |
| | 4 | D36 | D90 | D144 | ... | D1872 | D1926 |
| TRACK0 | 5 | D13 | D67 | D121 | ... | D1849 | D1903 |
| OR | 6 | D31 | D85 | D139 | ... | D1867 | D1921 |
| TRACK6 | 7 | D49 | D103 | D157 | ... | D1885 | D1939 |
| | 8 | D8 | D62 | D116 | ... | D1844 | D1898 |
| | 9 | D26 | D80 | D134 | ... | D1862 | D1916 |
| | 10 | D44 | D98 | D152 | ... | D1880 | D1934 |
| | i=2 | D3 | D57 | D111 | ... | D1839 | D1893 |
| | 3 | D21 | D75 | D129 | ... | D1857 | D1911 |
| | 4 | D39 | D93 | D147 | ... | D1875 | D1929 |
| TRACK1 | 5 | D16 | D70 | D124 | ... | D1852 | D1906 |
| OR | 6 | D34 | D88 | D142 | ... | D1870 | D1924 |
| TRACK7 | 7 | D52 | D106 | D160 | ... | D1888 | D1942 |
| | 8 | D11 | D65 | D119 | ... | D1847 | D1901 |
| | 9 | D29 | D83 | D137 | ... | D1865 | D1919 |
| | 10 | D47 | D101 | D155 | ... | D1883 | D1937 |
| | i=2 | D6 | D60 | D114 | ... | D1842 | D1896 |
| | 3 | D24 | D78 | D132 | ... | D1860 | D1914 |
| | 4 | D42 | D96 | D150 | ... | D1878 | D1932 |
| TRACK2 | 5 | D1 | D55 | D109 | ... | D1837 | D1891 |
| OR | 6 | D19 | D73 | D127 | ... | D1855 | D1909 |
| TRACK8 | 7 | D37 | D91 | D145 | ... | D1873 | D1927 |
| | 8 | D14 | D68 | D122 | ... | D1850 | D1904 |
| | 9 | D32 | D86 | D140 | ... | D1868 | D1922 |
| | 10 | D50 | D104 | D158 | ... | D1886 | D1940 |
| | i=2 | D9 | D63 | D117 | ... | D1845 | D1899 |
| | 3 | D27 | D81 | D135 | ... | D1863 | D1917 |
| | 4 | D45 | D99 | D153 | ... | D1881 | D1935 |
| TRACK3 | 5 | D4 | D58 | D112 | ... | D1840 | D1894 |
| OR | 6 | D22 | D76 | D130 | ... | D1858 | D1912 |
| TRACK9 | 7 | D40 | D94 | D148 | ... | D1876 | D1930 |
| | 8 | D17 | D71 | D125 | ... | D1853 | D1907 |
| | 9 | D35 | D89 | D143 | ... | D1871 | D1925 |
| | 10 | D53 | D107 | D161 | ... | D1889 | D1943 |
| | i=2 | D12 | D66 | D120 | ... | D1848 | D1902 |
| | 3 | D30 | D84 | D138 | ... | D1866 | D1920 |
| | 4 | D48 | D102 | D156 | ... | D1884 | D1938 |
| TRACK4 | 5 | D7 | D61 | D115 | ... | D1843 | D1897 |
| OR | 6 | D25 | D79 | D133 | ... | D1861 | D1915 |
| TRACK10 | 7 | D43 | D97 | D151 | ... | D1879 | D1933 |
| | 8 | D2 | D56 | D110 | ... | D1838 | D1892 |
| | 9 | D20 | D74 | D128 | ... | D1856 | D1910 |
| | 10 | D38 | D92 | D146 | ... | D1874 | D1928 |
| | i=2 | D15 | D69 | D123 | ... | D1851 | D1905 |
| | 3 | D33 | D87 | D141 | ... | D1869 | D1923 |
| | 4 | D51 | D105 | D159 | ... | D1887 | D1941 |
| TRACK5 | 5 | D10 | D64 | D118 | ... | D1846 | D1900 |
| OR | 6 | D28 | D82 | D136 | ... | D1864 | D1918 |
| TRACK11 | 7 | D46 | D100 | D154 | ... | D1882 | D1936 |
| | 8 | D5 | D59 | D113 | ... | D1841 | D1895 |
| | 9 | D23 | D77 | D131 | ... | D1859 | D1913 |
| | 10 | D41 | D95 | D149 | ... | D1877 | D1931 | i : SYNC BLOCK NO.　　　j : BYTE POSITION NO.

Fig. 9

| ERROR PATTERN | INTERPOLATING EQUATION |
|---|---|
| $a_{-1}$ $a_0$ $a_1$<br>0   1   0 | $a_0 = ( \quad a_{-1} + a_1 \quad )/2$ : 1st DEGREE |
| $a_{-1}$ $a_0$ $a_1$ $a_2$<br>0   1   0   0 | $a_0 = ( \quad a_{-1} \quad a_1 + 3a_2 \quad )/3$ : 2nd DEGREE r |
| $a_{-2}$ $a_{-1}$ $a_0$ $a_1$<br>0    0    1   0 | $a_0 = ( -a_{-2} + 3a_{-1} + a_1 \quad )/3$ : 2nd DEGREE l |
| $a_{-2}$ $a_{-1}$ $a_0$ $a_1$ $a_2$<br>0    0    1   0   0 | $a_0 = ( \quad -2a_{-2} + 6a_{-1} \quad +2a_3 -a_4)/5$ : 3rd DEGREE r |
| $a_{-3}$ $a_{-2}$ $a_{-1}$ $a_0$ $a_1$ $a_2$<br>0    0    0    1   0   0 | $a_0 = ( \quad -4a_{-3} + 9a_{-2} \quad +9a_2 - 4a_3 \quad )/10$ : 3rd DEGREE c |
| $a_{-3}$ $a_{-2}$ $a_{-1}$ $a_0$ $a_1$<br>0    0    0    1   0 | $a_0 = (-a_{-4} + 2a_{-3} \quad +6a_{-1} - 2a_2 \quad )/5$ : 3rd DEGREE l |
| $a_{-4}$ $a_{-3}$ $a_{-2}$ $a_{-1}$ $a_0$ $a_1$ $a_2$ $a_3$ $a_4$<br>0    0    0    0    1   0   0   0   0 | $a_0 = (-a_{-4} \quad +16a_{-1} +16a_1 \quad - a_4)/30$ : 3rd DEGREE x |
| $a_{-4}$ $a_{-3}$ $a_{-2}$ $a_{-1}$ $a_0$ $a_1$ $a_2$ $a_3$ $a_4$<br>0    0    0    0    1   0   0   0   1 | $a_0 = (-3a_{-4} \quad +28a_{-1} \quad +14a_2 \quad -3a_4)/35$ : 3rd DEGREE y |
| $a_{-4}$ $a_{-3}$ $a_{-2}$ $a_{-1}$ $a_0$ $a_1$ $a_2$ $a_3$ $a_4$<br>0    0    0    1    1   0   0   0   0 | $a_0 = ( \quad -4a_{-3} \quad +14a_{-2} \quad +28a_1 \quad -4a_3 \quad )/35$ : 3rd DEGREE z |
| $a_{-4}$ $a_{-3}$ $a_{-2}$ $a_{-1}$ $a_0$ $a_1$ $a_2$ $a_3$ $a_4$<br>0    0    0    0    1   1   0   0   0 | $a_0 = ( \quad a_{-3} - 6a_{-2} + 15a_{-1} + 15a_1 - 6a_2 + a_3 \quad )/20$ : 5th DEGREE c |
| $a_{-4}$ $a_{-3}$ $a_{-2}$ $a_{-1}$ $a_0$ $a_1$ $a_2$ $a_3$ $a_4$<br>0    0    0    0    1   0   0   0   0 | $a_0 = ( \quad 4a_{-3} - 21a_{-2} + 42a_{-1} \quad +21a_2 -14a_3 + 3a_4)/35$ : 5th DEGREE r |
| $a_{-4}$ $a_{-3}$ $a_{-2}$ $a_{-1}$ $a_0$ $a_1$ $a_2$ $a_3$ $a_4$<br>0    0    0    1    1   0   0   0   0 | $a_0 = (3a_{-4} -14a_{-3} +21a_{-2} \quad +42a_1 -21a_2 + 4a_3 \quad )/35$ : 5th DEGREE l |
| $a_{-4}$ $a_{-3}$ $a_{-2}$ $a_{-1}$ $a_0$ $a_1$ $a_2$ $a_3$ $a_4$<br>0    0    0    0    1   0   0   0   0 | $a_0 = (-a_{-4} + 8a_{-3} -28a_{-2} +56a_{-1} -28a_2 + 8a_3 - a_4)/70$ : 7th DEGREE |

DIGITAL AUDIO SIGNAL PROCESSING APPARATUS AND METHOD FOR ERROR CONCEALMENT

BACKGROUND OF THE INVENTION

The present invention relates to a digital audio signal interpolation technique and, more particularly, to such technique for providing an interpolated value for an audio error data sample of a digital audio signal by utilizing Lagrange polynomial equations.

Digital audio signals may be recorded and/or reproduced not only from audio exclusive-type devices such as a compact disc (CD) player, a mini disc (MD) device, a digital audio tape (DAT) recorder or the like, but also from devices which may record and/or reproduce audio and image data such as a digital video cassette tape recorder (VTR) or the like. In such digital audio signal recording and/or reproducing devices, errors may occur during the recording or reproducing of data. To correct such errors, error correction codes may be utilized. However, if an error exceeds the correcting ability of the error correction code, such error may not be corrected. In this situation, the error data or sample may be concealed by replacing it with a data value obtained by interpolation, such as mean value interpolation, involving one or more correct or non-error samples which are close to the error sample in time.

Mean value interpolation procedures will now be described with reference to FIGS. 1, 2A and 2B. FIG. 1 illustrates a sequence of audio samples with respect to time which includes an error sample a0. An interpolation value of the sample a0 is formed by a mean value {½(a-1+a1)} of correct or non-error audio samples a-1 and a1 which respectively occur before and after the error sample a0. FIG. 2A illustrates a sequence of audio samples with respect to time which includes two adjacent or continuous error samples a0 and a1. The error sample a0 may not be interpolated by the mean value of the adjacent samples because the subsequent sample a1 is also an error sample. As a result, the error sample a0 is replaced with a0' which has a value substantially equal to the previous correct sample a-1 (or, in other words, the sample value a-1 is held for the sample a0), and an interpolated value a1' of the next error sample a1 is formed by a mean value of a0' and a2. FIG. 2B illustrates a sequence of audio samples with respect to time which includes three adjacent or continuous error samples a-1, a0 and a1. In this situation, the error samples a-1 and a0 are replaced with a-1' and a0' which each have a value substantially equal to a-2 (or, in other words, the sample value a-2 is held for the samples a-1 and a0), and an interpolation value a1' of the next error sample a1 is formed by a mean value of a0' and a2. As a result, as the number of continuous error samples increases, the number of error samples which are merely replaced by correct sample values increases. As is to be appreciated, such mere replacement of error samples with correct samples which are nearby or adjacent to the respective error sample may produce a deformed or significantly incorrect signal waveform.

In the above-described interpolating procedure wherein error samples are replaced by nearby correct sample values and mean value interpolation is performed, the complexity of the hardware utilized to perform such interpolating procedure may be relatively simple. However, such method may present a number of problems or disadvantages. That is, a high frequency component(s) in the audio data may be lost due to the mean value interpolation and, as previously described, the produced signal waveform may be significantly deformed as a result of the mere replacement of error samples with nearby correct sample values. Additionally, when mean value interpolation is performed every predetermined number of samples, a noise may be generated which has a specific frequency which may correspond to the frequency at which the mean value interpolation is performed.

OBJECTS AND SUMMARY OF THE INVENTION

An object of the present invention is to provide a digital audio signal processing apparatus and method which can overcome the above-described problems so as to improve the quality of interpolated audio data and reduce or prevent the generation of noises having a specific frequency due to interpolation processing.

More specifically, it is an object of the present invention to provide a digital audio signal processing apparatus and method wherein a respective error audio data sample may be replaced with a value obtained in accordance with an interpolating equation which may correspond to a high degree Lagrange polynomial equation or a mean value interpolating equation depending upon the presence or absence of errors in the data samples nearby the respective error audio data sample.

In accordance with an aspect of the present invention, an apparatus and method for determining an interpolated value for an audio data error sample of a digital audio signal is provided. The apparatus comprises a device for detecting an error pattern representing a number of audio data samples including the audio data error sample; and a device, responsive to the detected error pattern, for selecting an interpolating equation of an nth degree (where n=1, 2, 3 . . . ) and for obtaining the interpolated value for the audio data error sample on the basis of the selected interpolating equation. The method for determining an interpolated value for an audio data error sample comprises steps which correspond to the present apparatus.

In the present invention, an error pattern is detected which corresponds to the presence or absence of errors of a number of data samples before and after an error sample to be concealed. Based upon the detected error pattern, data sample values may be processed in a manner corresponding to an interpolating equation of an nth degree (where n=1, 2, 3 . . . ) selected from among a plurality of interpolating equations obtained from Lagrange polynomial equations. By utilizing a high degree interpolation equation, as compared with a simple mean value interpolation equation, a high frequency component(s) may be prevented from being lost and the noise which may otherwise be generated due to the repeated use of the mean value interpolation equation may be prevented. Additionally, such use of an nth degree interpolating equation may prevent the resultant signal waveform from being significantly deformed as compared to the above-described interpolating procedure wherein error samples are merely replaced by nearby correct sample values.

Other objects, features and advantages according to the present invention will become apparent from the following detailed description of an illustrated embodiment when read in connection with the accompanying drawings in which corresponding components are identified by the same reference numerals.

BRIEF DESCRIPTION OF THE DRAWINGS

FIG. 5 is a table which provides shuffling pattern data for a 525/60 system which may be utilized by the digital audio signal reproducing apparatus of FIG. 3;

FIG. 6 is a table which provides shuffling pattern data for a 625/50 system which may be utilized by the digital audio signal reproducing apparatus of FIG. 3;

FIG. 9 is a table of error patterns and corresponding interpolating equations which may be used in the concealing circuit of FIG. 7;

DETAILED DESCRIPTION OF THE PREFERRED EMBODIMENT

An embodiment of the present invention will now be described with reference to the accompanying drawings.

Figure 1:
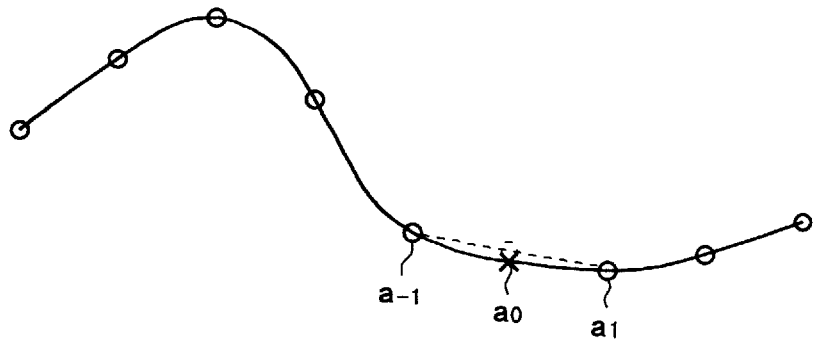
FIG. 1 is a diagram to which reference will be made in explaining mean value interpolation.
Figure 2A:
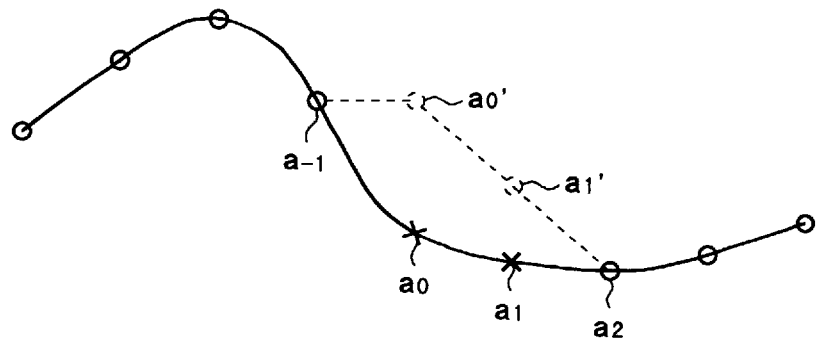
FIGS. 2A and 2B are diagrams to which reference will be made in explaining an interpolating method when two or more adjacent errors occur.
Figure 2B:
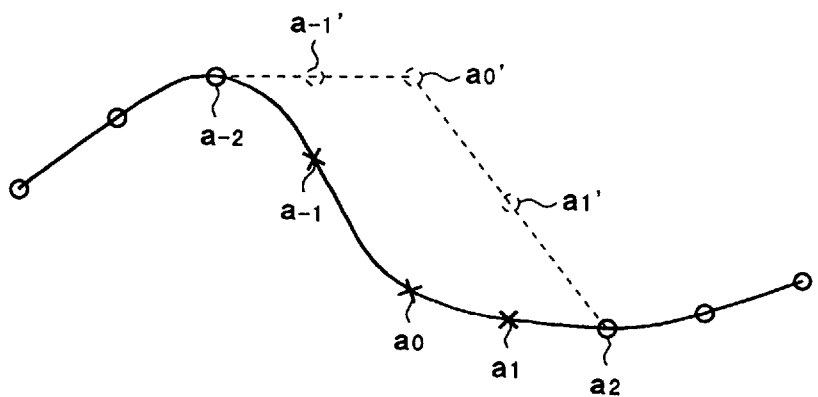
Figure 3:
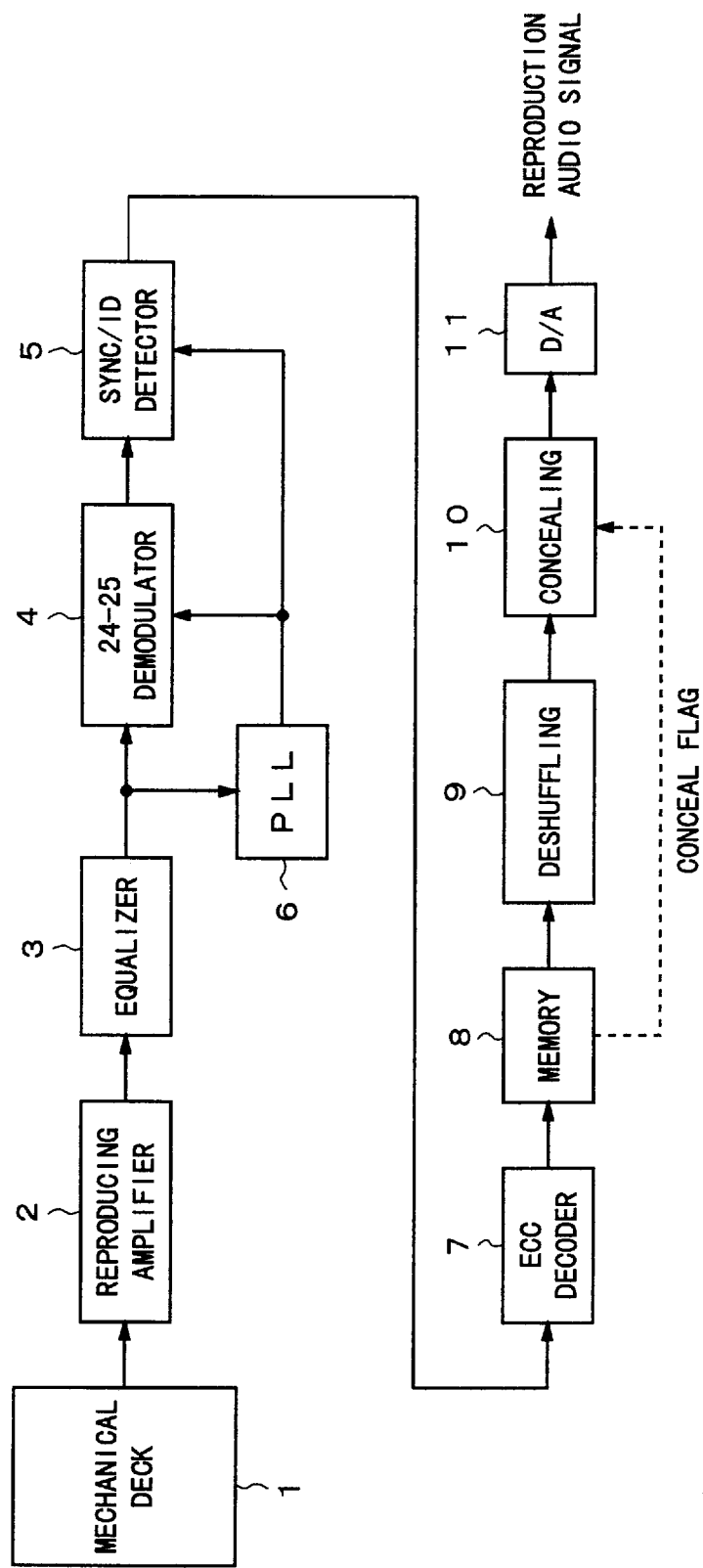
FIG. 3 is a diagram of a digital audio signal reproducing apparatus according to an embodiment of the present invention.

FIG. 3 illustrates a digital audio signal reproducing apparatus. Such apparatus generally includes a mechanical deck 1, a reproducing amplifier 2, an equalizer 3, a channel coding demodulator 4, a sync/identification (ID) detector 5, a phase locked-loop (PLL) circuit 6, an error correction code (ECC) decoder 7, a memory 8, a deshuffling circuit 9, and a concealing circuit 10.

Figure 4:
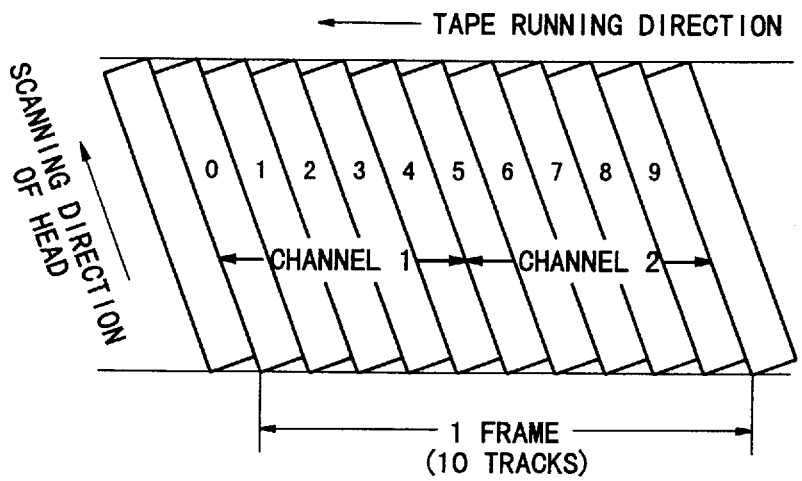
FIG. 4 is a diagram of a track pattern which may be employed by the present invention.

The mechanical deck 1 may be operable with a magnetic tape cassette or the like and may include a pair of magnetic heads attached to a rotary drum at an angular interval of 180 degrees, a mechanism for accessing the magnetic tape from the tape cassette and wrapping such tape around the rotary drum, a tape running mechanism for running the magnetic tape along a predetermined path, and the like. The mechanical deck 1 may be a helical scan type digital video cassette tape recorder (VCR) which may record signals in oblique tracks formed on the magnetic tape. More specifically, as shown in FIG. 4, oblique tracks may be sequentially formed on the magnetic tape and signals may be alternately recorded therein by the pair of magnetic heads. Video and audio signals corresponding to one frame may be recorded in ten tracks in a so-called 525/60 system (525 lines/60 fields per second). As an example, track numbers 0 to 9 may be allocated to one such frame as shown in FIG. 4. Each of these tracks may include an area for recording video data, an area for recording audio data, and an area for recording subcode data.

The audio data to be recorded in the above-described oblique tracks may be digitized at a predetermined sampling frequency, such as 48 kHz, 44.1 kHz, or 32 kHz. One sample of such audio data may be represented by a predetermined number of bits, such as 16 bits. Additionally, the audio signal data may represent a number of channels, such as two channels which, for example, may be a right channel and a left channel. In this situation, and as shown in FIG. 4, the digital audio signal data of one of the two channels of one frame may be recorded in the first five tracks 0–4 and the digital audio signal data of the other of the two channels of the respective frame may be recorded in the second five tracks 5–9.

Returning to FIG. 3, a signal may be reproduced from the mechanical deck 1 and supplied through the reproducing amplifier 2 to the equalizer 3. An output of the equalizer 3 is supplied to the channel coding demodulator 4 and the PLL 6. The channel coding demodulator 4 is adapted to perform a predetermined type of coding technique, such as a coding technique wherein an information word of 24 bits is converted into a code word of 25 bits. An output of the demodulator 4 is supplied to the sync/ID detector 5, wherein sync and/or identification information may be detected from the received signal. That is, the received or recorded data may be formed of a number of sync blocks each having sync information followed by identification (ID) information, data (such as video data, audio data, or subcode data), and parity data such as inner code parity data on a sync block unit basis. The PLL 6 provides a clock signal which is synchronized with the reproduction signal and supplies such clock signal to the demodulator 4 and detector 5.

An output signal of the sync/ID detector 5 is supplied to the ECC decoder 7 which is adapted to decode an error correction code and correct an error sample. The error correction code may be a product code which may be utilized in encoding an inner code in the recording/reproducing direction and in encoding an outer code in a direction perpendicular to the recording/reproducing direction. Each of the audio data, video data, and subcode data may be independently processed or encoded with a product code. As a result, the decoder 7 may decode the inner code and rearrange the data arrangement, and after which decode the outer code for the audio data, the video data and the subcode data. However, since the present invention is primarily concerned with audio data, the following discussion pertaining to the output of the ECC decoder 7 will be directed only to the audio data.

Thus, the ECC decoder 7 may correct an error sample by utilizing the error correction code. However, not all error samples may be corrected by the ECC decoder 7. For example, if an error exceeds a predetermined criteria or, if the error exceeds the correction ability of the error correction code, such error may not be corrected by the ECC decoder 7. In any event, the ECC decoder 7 provides an output which may include an error flag to the memory 8 for storage therein. Such error flag may provide an indication as to the presence or absence of an error for each data sample. For example, an error flag may be provided for each error sample which is not corrected by the ECC decoder 7. Alternatively, an error flag may be provided for each error sample detected by the ECC decoder 7 even if such error sample is corrected by the ECC decoder.

An output of the memory 8 is supplied to the deshuffling circuit 9 which is adapted to perform a deshuffling operation which is substantially opposite to a shuffling operation performed during the recording of the audio data onto the magnetic tape. Such shuffling operation may rearrange the data arrangement in a predetermined manner, as hereinafter more fully described.

An output from the deshuffling circuit 9 is supplied to the concealing circuit 10. The concealing circuit 10 may also receive a conceal flag (error flag) from the memory 8. As hereinafter more fully described, such conceal flag may represent an error sample which was unable to be corrected by the ECC decoder 7 and which is to be processed or concealed so that the error sample is less apparent during reproduction. An output of the concealing circuit 10 is supplied to a digital-to-analog (D/A) converter 11, whereupon the digital audio data is converted into an analog audio signal and outputted therefrom.

FIGS. 5 and 6 illustrate shuffling patterns of audio data which may be utilized during the recording of the audio data for two standards or systems. In particular, FIG. 5 illustrates a shuffling pattern for the 525/60 system wherein one frame of data is recorded onto ten tracks (tracks 0 to 9) in a manner as previously described, and FIG. 6 illustrates a shuffling pattern for a 625/50 system (that is, 625 lines/50 fields per second) wherein one frame of data is recorded onto twelve tracks (tracks 0 to 11). FIGS. 5 and 6 also illustrate shuffling patterns for a 2-channel mode in which the audio data of one channel is recorded into the first five tracks (or six tracks for the 625/50 system) and the audio data of the other channel is recorded into the second five (or six) tracks. In FIGS. 5 and 6, D0 to D1619 represent audio samples included in one frame, i represents a sync block number in a track and j represents a byte position number in a sync block. As previously described, each audio sample of each channel may be represented by 16 bits.

In FIG. 5, five continuous samples of each channel, for example, D0 to D4 are respectively distributed or shuffled to the track 0 (or track 5), track 2 (or track 7), track 4 (or track 9), track 1 (or track 6), and track 3 (or track 8). In association therewith, the position of the sync block recorded in each track is also sequentially shifted or shuffled. Such shuffling may make continuous errors less apparent during reproduction. For example, consider the situation wherein a large number of consecutive samples are damaged due to a scratch or the like which occurred after the samples had been recorded. In this situation, if the samples had not been shuffled prior to recording, the large number of damaged samples would be continuously provided during reproduction which would make the error due to the scratch readily apparent to a listener. However, if the samples had been shuffled prior to recording, the samples damaged by the scratch would not be continuous samples. As a result, a large number of continuous error samples would not be provided during reproduction. Instead, the error samples would be intermixed with other samples so that the error due to the scratch would not be readily apparent to a listener during reproduction. A similar shuffling technique is utilized in the 625/50 system of FIG. 6.

Figure 11:
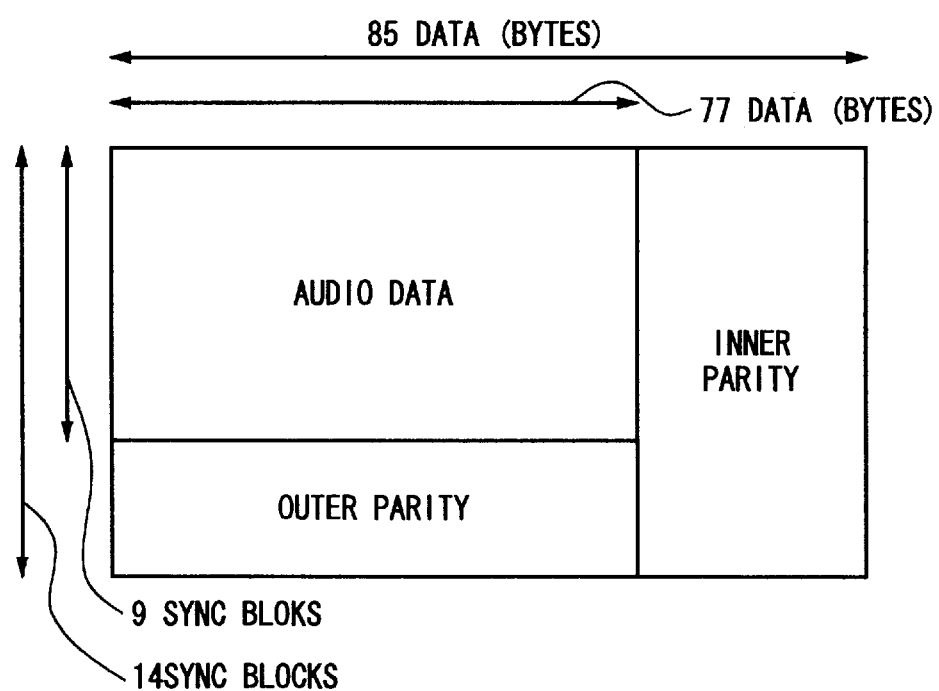
FIG. 11 is a diagram to which reference will be made in explaining 85,77 and 14,9 Reed Solomon codes.

The encoding of the product code may be performed for each audio data sample recorded in each track. The encoding of the inner code may be performed for a plurality of data (for example, for each sync block) arranged in the horizontal direction in FIGS. 5 and 6, and the encoding of the outer code may be performed for a plurality of data arranged in the vertical direction. As an example, a so-called (85, 77) Reed Solomon code may be used as an inner code and a so-called (14, 9) Reed Solomon code may be used as an outer code. FIG. 11 provides an illustration of such 85,77 and 14,9 Reed Solomon codes. As a result, errors of up to four bytes may be corrected by the inner code and errors of up to two bytes may be corrected by the outer code.

The above-described error correction encoding may not correct all errors. That is, if a relatively large number of errors have occurred due to a scratch or a fingerprint on the tape or the like, all of such errors may not be corrected. As an example, consider the situation wherein all of the data of the track 0 is error data. In this situation, interpolated values may be obtained for audio samples D0, D5, D10, D15, ... , and D1615. As such, due to the described shuffling of data, an audio sample may be periodically replaced with an interpolated value or concealed every five samples. Such periodic interpolation may result in a problem similar to that produced in the above-described holding or mean value interpolation technique. That is, noises having a specific frequency may be generated in the reproduced audio signal. The present concealment technique, as hereinbelow described, may solve such noise problem.

Figure 7:
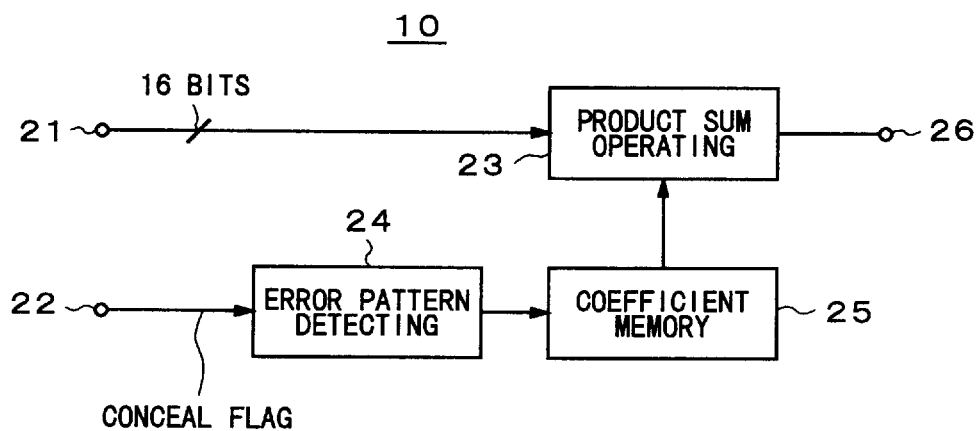
FIG. 7 is a diagram of a concealing circuit included in the digital audio signal reproducing apparatus of FIG. 3.

An example of the present concealing circuit 10 (FIG. 3) is illustrated in FIG. 7. As shown therein, such concealing circuit generally includes a product sum operating circuit 23, an error pattern detecting circuit 24 and a coefficient memory 25. Audio data of one sample, which may have 16 bits, may be supplied through an input terminal 21 to the product sum operating circuit 23. A conceal flag, indicative of the presence or absence of an error of each sample, may be supplied through an input terminal 22 to the error pattern detecting circuit 24. Such conceal flags may be continuous with respect to time. The error pattern detecting circuit 24 is adapted to detect an error pattern from the conceal flags supplied thereto. Information pertaining to the detected error pattern is supplied to the coefficient memory 25.

Data, such as coefficient and divisor data, as a function of error patterns may be previously stored in the coefficient memory 25. As a result, upon receiving detected error pattern information from the error pattern detecting circuit 24, the corresponding coefficient(s) and/or divisor(s) may be read out and supplied to the product sum operating circuit 23.

Figure 8:
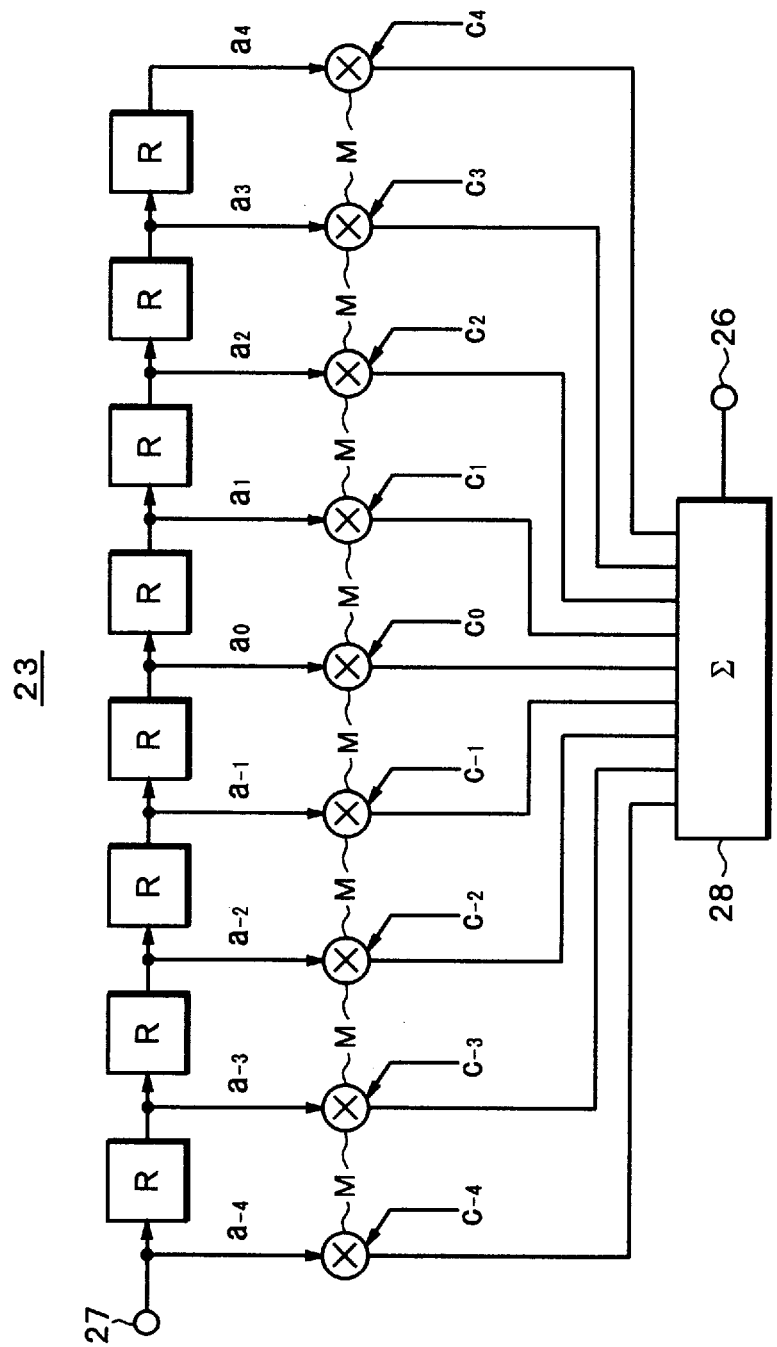
FIG. 8 is a diagram of a product sum operating circuit of the concealing circuit of FIG. 7.

An example of the product sum operating circuit 23 is illustrated in FIG. 8. As shown therein, such product sum operating circuit generally includes a number of delay elements R, a number of multipliers M and an adding circuit 28. The product sum operating circuit 23 is adapted to perform an arithmetic operation of a linear coupling equation of coefficients and data in a manner similar to an arithmetic operation of a digital filter and to provide concealed reproduction audio data at an output terminal 26. More specifically, samples of audio data may be sequentially supplied through an input terminal 27 to a series circuit of a predetermined number of delay elements R, such as eight delay elements. Each delay element is adapted to have a predetermined delay time associated therewith, such as the delay time associated with one sample period. As a result, nine audio samples a-4, a-3, . . . , a0, a1, . . . , and a4, which are continuous with respect to time, may be supplied from taps between the serial connection of the delay elements. Such tap outputs may be respectively supplied to multipliers M wherein they may be respectively multiplied by coefficients c-4, c-3, . . . , c0, c1, . . . , and c4 supplied from the coefficient memory 25. Multiplication products from the multipliers M may be supplied to the adding circuit 28 wherein they may be added together so as to form the concealed audio signal which is supplied to the output terminal 26.

Thus, the present concealing circuit detects an error pattern in the error pattern detecting circuit 24, supplies information pertaining to such detected error pattern to the coefficient memory 25 wherein previously stored coefficients corresponding to the detected error pattern are obtained, supplies such coefficients to the product sum operating circuit 23 wherein audio data which may have been delayed is respectively multiplied by the coefficients and the resultant products added together to form an audio signal. The arithmetic operations performed by the product sum operating circuit 23 may correspond to interpolating equations. An example of the relationship between such interpolating equations and the error patterns is illustrated in FIG. 9.

In FIG. 9, a target or desired data sample to be interpolated is represented by a0, data preceding the target data sample a0 with respect to time may be represented by a-1, a-2, . . . , and data subsequent to the target data sample a0 may be represented by a1, a2, . . . The error patterns (conceal flag) of FIG. 9 indicate the presence or absence of errors of the data samples. In particular, "0" indicates the absence of an error and "1" indicates the presence of an error.

The interpolating equations of FIG. 9 may range from a linear or first degree equation (which corresponds to mean value interpolation) to higher degree equations, such as a seventh degree equation. Such interpolating equations may be identified by the corresponding degree number and a predetermined suffix. The higher degree equations may be obtained from Lagrange interpolating polynomials. Thus, as an example, in case of mean value interpolation, a value of a point (a0) is obtained as a mean value of two points (a-1 and a1). As another example, in the case of the 7th degree interpolation equation, a polynomial having eight terms (or passing through eight points) a-4, a-3, . . . , a3, and a4 is obtained by a Lagrange's technique and simplified, whereupon the interpolation value of a0 may be obtained.

Figure 10:
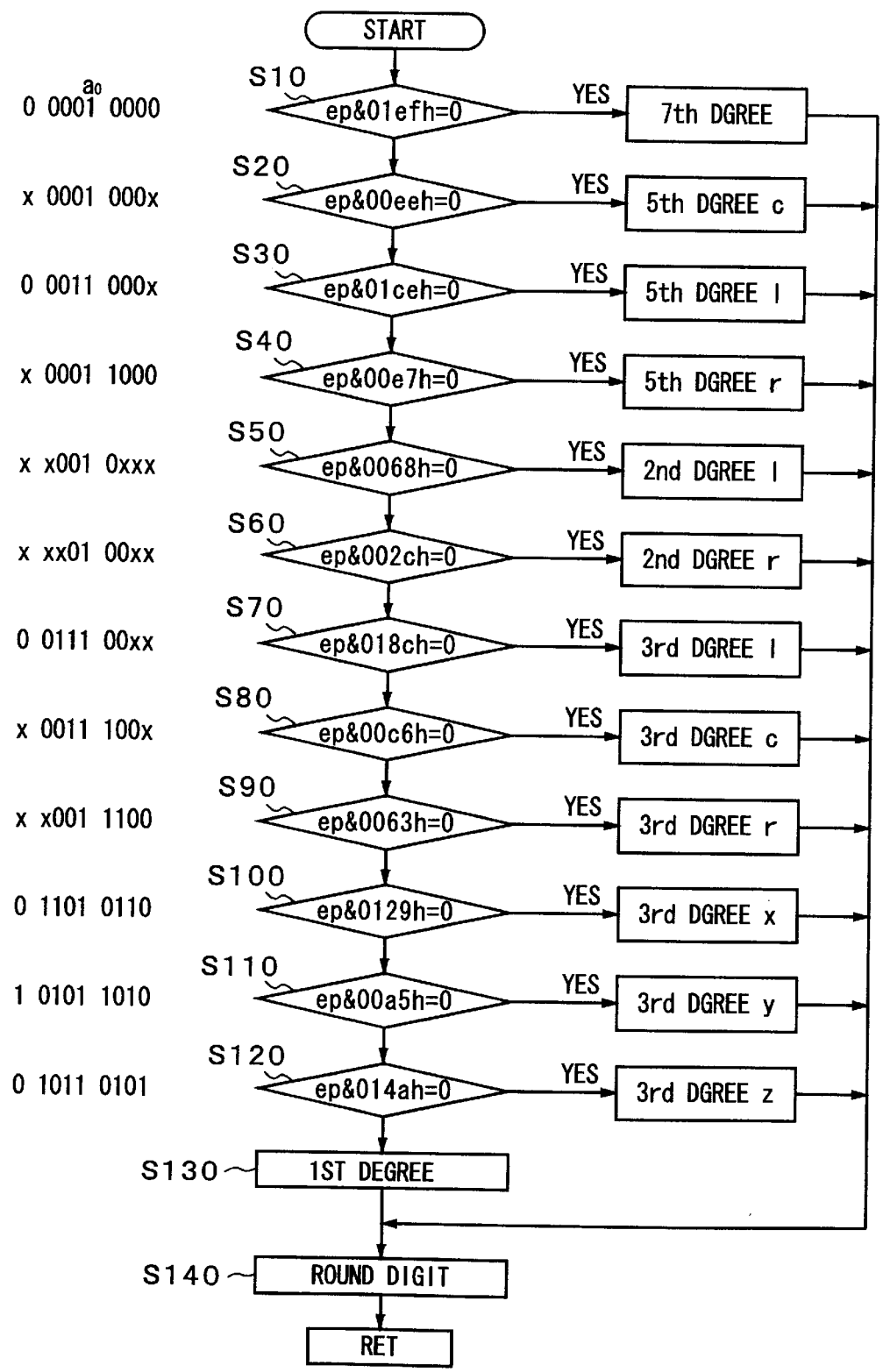
FIG. 10 is a flowchart to which reference will be made in explaining an interpolating procedure of the present invention.

A process to obtain the interpolation values for the interpolation equations of FIG. 9 will now be described with reference to the flowchart of FIG. 10. As shown in FIG. 10, each error pattern has nine bits so as to represent nine samples, that is, the target data sample a0, four data samples before the target sample a0, and four data samples after the target data sample a0. "0" and "1" represent the absence or presence of an error in a manner similar to that previously described with reference to FIG. 9. Additionally, "x" indicates that either one of "0" and "1" may apply.

The process shown in FIG. 10 involves a number of determining steps which are sequentially arranged in which each such determining step performs a comparison or an "AND" operation between a received error pattern (ep) and a check pattern. In each determining step, if the result of the operation performed therein is affirmative so as to indicate that the error pattern shown to the left of the respective step represents the current error pattern, then the corresponding interpolating equation is selected. (The interpolating equation are identified by the symbols used in FIG. 9.) From the selected interpolating equation, the interpolation data is formed.

The processing of FIG. 10 will now be more fully described. Upon starting such processing, processing proceeds to determining step S10 wherein a determination is made as to whether the equation [ep & 01efh=0] is affirmative. As is to be appreciated, the result of this equation indicates whether the current error pattern ep is equal to the check pattern. In this equation, the check pattern is 01efh (wherein h indicates hexadecimal format). As a result, such check bit pattern is (01 1110 1111) (the "0" at the head is not used for checking). The "&" symbol represents an AND operation.

If the determination in step S10 is affirmative, the current error pattern is the same as the error pattern (0 0001 0000) shown to the left of step S10. In this situation, the 7th degree interpolating equation is selected. As a result, the appropriate coefficients may be read out from the coefficient memory 25 (FIG. 7) and the interpolation value a0 may be formed by use of the 7th degree interpolating equation as a linear coupling of such coefficients and the correct eight samples a-4, a-3, a-2, a-1, a1, a2, a3, and a4. Such 7th degree interpolating equation is: a0=(-a-4+8a-3-28a-2+56a-1+56a1-28a2+8a3-a4)/70, as shown in FIG. 9.

Thereafter, processing proceeds to step S140 wherein the obtained interpolation value a0 is subjected to a rounding operation. For example, the digits after a decimal point may be rounded off such that the value a0 is rounded off to the nearest or next highest integer.

If, however, the determination of step S10 is negative, processing proceeds to step S20 wherein a determination is made as to whether the equation [ep & 00eeh=0] is affirmative. In this equation, the check bit pattern is (00 1110 1110). As such, when the current error pattern ep is (x 0001 00x), the equation of step S20 is satisfied. If the determination of step S20 is affirmative, the current error pattern is (x 0001 000x) as shown to the left of step S20, whereupon the 5th degree c interpolating equation (a0=(a-3-6a-2+15a-1+15a1-6a2+a3)/20) is selected and the interpolation value a0 is calculated by such interpolating equation. Thereafter, processing proceeds to step S140 wherein the interpolation value a0 may be rounded in a manner similar to that previously described.

If the determination of step S20 is negative, processing proceeds to step S30. As is to be appreciated, the processing performed in steps S30–S120 is similar to that performed in steps S10 and S20. Accordingly, in the interest of brevity, further discussion of such processing of steps S30–S120 is omitted herein.

Thus, the current error pattern may be detected or determined by the processing of steps S10–S120 and the appropriate interpolating equation is selected in accordance with the detected error pattern, whereupon the interpolation value may be calculated. If the processing proceeds from step S10 through step S120 without the current error pattern being detected (or, in other words, without an affirmative result), processing proceeds to step S130 wherein linear or mean value interpolation is performed. Thereafter, processing proceeds to step S140 wherein a digit rounding process may be performed as previously described.

The above error patterns of FIGS. 9 and 10 do not represent all of the error patterns which may be considered. However, the above error patterns may represent error patterns most likely to occur after deshuffling of the above-described shuffled data due to an error involving one or more tracks such as from a head clog, a scratch on the tape, or the like. For example, the error pattern for which the 7th degree interpolating equation may be used may occur when the data of one of the five tracks is error data. Similarly, interpolation may also be performed to the error pattern which occurs when the data of two or three tracks is error data.

The present invention may be applied not only to error data interpolation in a digital VCR, but may also be applied to error data interpolation in a disk reproducing apparatus or the like in which a DAT (digital audio tape), a CD, a digital video disc (DVD), or the like is used as a medium.

Further, although the data processed by the present invention was described as being shuffled in accordance with a predetermined data shuffling technique, the present invention is not so limited. Instead, other techniques of data shuffling may be utilized or, alternatively, the present invention may be used with non-shuffled data.

Furthermore, although the product sum operating circuit 23 was described with regard to FIG. 8, the present invention is not so limited. That is, interpolation values may be obtained from a number of other types of circuits or devices, such as a digital signal processor (DSP). Such DSP may process coefficients and/or a divisor(s) received from the memory 25 (FIG. 7) in accordance with the appropriate or selected interpolating equation.

Additionally, although the present invention was described as utilizing interpolating equations obtained from Lagrange polynomial equations, the present invention is not so limited. Instead, other interpolating equations may also be utilized.

Thus, by using higher degree interpolation as compared to the previously described holding and mean value interpolation technique, the present invention may prevent a high frequency component(s) from being lost due to interpolation and may prevent the produced signal waveform from becoming significantly deformed. Further, by utilizing the present invention, when the data is rearranged or shuffled, the generation of noises having a specific frequency component which may otherwise be caused by the periodic mean value interpolating of error data may be prevented. Furthermore, the present invention considers the form of the shuffled data and utilizes or stores error patterns which are likely to occur such that an efficient interpolation process may be performed.

Although a preferred embodiment of the present invention and modifications thereof have been described in detail herein, it is to be understood that this invention is not limited to this embodiment and modifications, and that other modifications and variations may be effected by one skilled in the art without departing from the spirit and scope of the invention as defined by the appended claims.

What is claimed is:

1. An apparatus for determining an interpolated value for an audio data error sample of a digital audio signal representing a plurality of audio data samples, said apparatus comprising:

means for detecting an error pattern representing a number of audio data samples including said audio data error sample; and means, responsive to the detected error pattern, for selecting an interpolating equation of an nth degree (where n=1, 2, 3 . . . ) and for obtaining said interpolated value for said audio data error sample on the basis of the selected interpolating equation.

2. An apparatus according to claim 1, wherein the selecting means selects said interpolating equation from among a plurality of interpolating equations obtained from Lagrange polynomial equations.

3. An apparatus according to claim 1, wherein said audio data samples of said digital audio signal are shuffled during a recording operation such that said audio data samples are set to an arrangement which is different from an original arrangement and wherein said apparatus further comprises means for deshuffling the shuffled audio data samples and wherein the detecting means detects the error pattern by comparing a current error pattern to at least one of a plurality of data patterns which represent error patterns which may readily occur as a result of the deshuffling of said shuffled audio data samples.

4. A method of determining an interpolated value for an audio data error sample of a digital audio signal representing a plurality of audio data samples, said method comprising the steps of:

detecting an error pattern representing a number of audio data samples including said audio data error sample;

selecting an interpolating equation of an nth degree (where n=1, 2, 3 . . . ) in response to the detected error pattern; and obtaining said interpolated value for said audio data error sample on the basis of the selected interpolating equation.

5. A method according to claim 4, wherein the selecting step selects said interpolating equation from among a plurality of interpolating equations obtained from Lagrange polynomial equations.

6. A method according to claim 4, wherein said audio data samples of said digital audio signal are shuffled during a recording operation such that said audio data samples are set to an arrangement which is different from an original arrangement and wherein said method further comprises the step of deshuffling the shuffled audio data samples and wherein the detecting step detects the error pattern by comparing a current error pattern to at least one of a plurality of data patterns which represent error patterns which may readily occur as a result of the deshuffling of said shuffled audio data samples.

7. An error sample processing apparatus comprising:

means for receiving a plurality of data samples having an error data sample to be concealed;

means for receiving a flag corresponding to each received data sample which indicates whether each said data sample has an error and for determining therefrom an error pattern representing an arrangement of a number of error data samples and a number of non-error data samples;

means, responsive to the determined error pattern, for obtaining a respective coefficient for the data samples in the determined error pattern; and means for processing the received data samples and the coefficients so as to produce an interpolated data sample for said error data sample to be concealed.

8. An error sample processing apparatus according to claim 7, wherein the processing performed by the processing means corresponds to a Lagrange polynomial equation.

9. An error sample processing apparatus according to claim 7, wherein the respective coefficient for each error data sample in said determined error pattern has a value of zero.

10. An error sample processing apparatus according to claim 7, wherein said processing means processes said received data samples and said coefficients in accordance with a respective Lagrange polynomial equation selected from among a plurality of Lagrange polynomial equations and further comprising means for comparing said determined error pattern to at least one of a plurality of predetermined data patterns so as to determine the selected Lagrange polynomial equation.

11. An error sample processing apparatus according to claim 9, wherein the processing means includes multiplying means for multiplying each non-error data sample by the respective coefficient.

12. An apparatus for processing reproduced digital audio data having an error data sample to be concealed, said apparatus comprising:

means for receiving a stream of digital audio data samples reproduced from a recording medium and having a number of error data samples, said data samples having been shuffled so as to have an arrangement different from an original data arrangement;

error correction means for correcting error data samples included in the received stream of audio data samples;

means for deshuffling the error corrected data samples so as to obtain a data arrangement similar to said original data arrangement; and means for concealing an error data sample which was not corrected by said error correction means, said concealing means including means for receiving a plurality of the deshuffled data samples having an error data sample to be concealed, means for receiving a flag corresponding to each received deshuffled data sample which indicates whether each said deshuffled data sample has an error and for determining therefrom an error pattern representing an arrangement of a number of error data samples and a number of non-error data samples, means for obtaining a respective coefficient for the data samples in the determined error pattern, and means for processing the received deshuffled data samples and the coefficients so as to produce an interpolated data sample for said error data sample to be concealed.

13. An apparatus according to claim 12, wherein the processing performed by the processing means corresponds to a Lagrange polynomial equation.

14. An error sample processing method comprising the steps of:

receiving a plurality of data samples having an error data sample to be concealed;

receiving a flag corresponding to each received data sample which indicates whether each said data sample has an error and determining therefrom an error pattern representing an arrangement of a number of error data samples and a number of non-error data samples;

obtaining, in response to the determined error pattern, a respective coefficient for the data samples in the determined error pattern; and processing the received data samples and the coefficients so as to produce an interpolated data sample for said error data sample to be concealed.

15. An error sample processing method according to claim 14, wherein the processing performed in the processing step corresponds to a Lagrange polynomial equation.

16. An error sample processing method according to claim 14, wherein the respective coefficient for each error data sample in said determined error pattern has a value of zero.

17. An error sample processing method according to claim 14, wherein the processing step processes said data samples and said coefficients in accordance with a respective Lagrange polynomial equation selected from among a plurality of Lagrange polynomial equations and further comprising the step of comparing said determined error pattern to at least one of a plurality of predetermined data patterns so as to determine the selected Lagrange polynomial equation.

18. An error sample processing method according to claim 16, wherein the processing step multiplies each non-error data sample by the respective coefficient.

19. A method for processing reproduced digital audio data having an error data sample to be concealed, said method comprising the steps of:

receiving a stream of digital audio data samples reproduced from a recording medium and having a number of error data samples, said data samples having been shuffled so as to have an arrangement different from an original data arrangement;

correcting error data samples included in the received stream of audio data samples;

deshuffling the error corrected data samples so as to obtain a data arrangement similar to said original data arrangement; and concealing an error data sample which was not corrected, said concealing step includes receiving a plurality of the deshuffled data samples having an error data sample to be concealed, receiving a flag corresponding to each received deshuffled data sample which indicates whether each said deshuffled data sample has an error and determining therefrom an error pattern representing an arrangement of a number of error data samples and a number of non-error data samples, obtaining a respective coefficient for the data samples in the determined error pattern, and processing the received deshuffled data samples and the coefficients so as to produce an interpolated data sample for said error data sample to be concealed.

20. A method according to claim 19, wherein the processing performed by the processing step corresponds to a Lagrange polynomial equation.

21. An error sample processing apparatus comprising:

means for receiving a plurality of data samples having an error data sample to be concealed;

means for receiving a flag which indicates whether a received data sample has an error and for determining therefrom an error pattern representing an arrangement of a number of error data samples and a number of non-error data samples;

coefficient means for respectively obtaining coefficients for the data samples in the determined error pattern by utilizing information pertaining to the determined error pattern and without utilizing a frequency associated with said error data sample; and means for processing the received data samples and the coefficients so as to produce an interpolated data sample for said error data sample to be concealed.

22. An error sample processing method comprising the steps of:

receiving a plurality of data samples having an error data sample to be concealed;

receiving a flag which indicates whether a received data sample has an error and determining therefrom an error pattern representing an arrangement of a number of error data samples and a number of non-error data samples;

obtaining coefficients for the data samples in the determined error pattern by utilizing information pertaining to the determined error pattern and without utilizing a frequency associated with said error data sample; and processing the received data samples and the coefficients so as to produce an interpolated data sample for said error data sample to be concealed.

* * * * *